United States Patent
Davidson et al.

(10) Patent No.: US 9,390,736 B1
(45) Date of Patent: Jul. 12, 2016

(54) MAGNETIC HEAD SEPARATOR CONNECTED TO A RAMP

(71) Applicant: Western Digital Technologies, Inc., Irvine, CA (US)

(72) Inventors: Marc Davidson, Sunnyvale, CA (US); David K. Myers, Campbell, CA (US); Terrance J. Willis, Campbell, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 0 days.

(21) Appl. No.: 14/336,820

(22) Filed: Jul. 21, 2014

Related U.S. Application Data (60) Provisional application No. 61/952,611, filed on Mar. 13, 2014.

(51) Int. Cl.
  *G11B 5/54* (2006.01)
  *G11B 5/48* (2006.01)
  *G11B 21/16* (2006.01)
  *G11B 21/22* (2006.01)
  *G11B 5/55* (2006.01)

(52) U.S. Cl.
  CPC .............. *G11B 5/4813* (2013.01); *G11B 5/483* (2015.09); *G11B 5/54* (2013.01); *G11B 5/5582* (2013.01); *G11B 21/16* (2013.01); *G11B 21/22* (2013.01)

(58) Field of Classification Search
  CPC ...... G11B 5/48; G11B 5/4806; G11B 5/4826; G11B 5/5565; G11B 5/5582; G11B 5/483; G11B 5/54; G11B 21/00; G11B 21/16; G11B 21/22
  USPC .......................... 360/245.7, 254.7, 254.8, 255
  See application file for complete search history.

(56) References Cited

U.S. PATENT DOCUMENTS

| | | | |
|---|---|---|---|
| 5,235,482 | A | 8/1993 | Schmitz |
| 6,046,889 | A | 4/2000 | Berding et al. |
| 6,052,890 | A | 4/2000 | Malagrino, Jr. et al. |
| 6,055,134 | A | 4/2000 | Boutaghou |
| 6,061,206 | A | 5/2000 | Foisy et al. |
| 6,067,209 | A * | 5/2000 | Aoyagi et al. ............. 360/254.7 |
| 6,101,876 | A | 8/2000 | Brooks et al. |
| 6,147,831 | A | 11/2000 | Kennedy et al. |
| 6,151,189 | A | 11/2000 | Brooks |
| 6,151,197 | A | 11/2000 | Larson et al. |
| 6,185,067 | B1 | 2/2001 | Chamberlain |
| 6,185,074 | B1 | 2/2001 | Wang et al. |
| 6,208,486 | B1 | 3/2001 | Gustafson et al. |
| 6,215,616 | B1 | 4/2001 | Phan et al. |
| 6,272,694 | B1 | 8/2001 | Weaver et al. |
| 6,278,584 | B1 | 8/2001 | Zhang et al. |
| 6,288,866 | B1 | 9/2001 | Butler et al. |
| 6,292,333 | B1 | 9/2001 | Blumentritt et al. |
| 6,344,950 | B1 | 2/2002 | Watson et al. |
| 6,349,464 | B1 | 2/2002 | Codilian et al. |
| 6,388,873 | B1 | 5/2002 | Brooks et al. |
| 6,417,979 | B1 | 7/2002 | Patton, III et al. |

(Continued)

*Primary Examiner* — Jefferson Evans (57) ABSTRACT

A magnetic hard disk drive apparatus includes a first slider with a magnetic head for recording to the disk, the first slider supported by a first suspension arm, and a second slider having a magnetic head, the second slider supported by a second suspension arm. The apparatus further includes a ramp configured to guide and hold the first and second suspension arms in place when parked, and a separator configured to be suspended beyond leading edges of the first and second sliders, such that the first and second sliders are suspended between the separator and the ramp.

20 Claims, 7 Drawing Sheets

(56) References Cited

U.S. PATENT DOCUMENTS

| | | |
|---|---|---|
| 6,421,208 B1 | 7/2002 | Oveyssi |
| 6,441,998 B1 | 8/2002 | Abrahamson |
| 6,449,129 B1 | 9/2002 | Macpherson et al. |
| 6,462,914 B1 | 10/2002 | Oveyssi et al. |
| 6,466,398 B1 | 10/2002 | Butler et al. |
| 6,469,871 B1 | 10/2002 | Wang |
| 6,502,300 B1 | 1/2003 | Casey et al. |
| 6,519,116 B1 | 2/2003 | Lin et al. |
| 6,529,345 B1 | 3/2003 | Butler et al. |
| 6,529,351 B1 | 3/2003 | Oveyssi et al. |
| 6,535,358 B1 | 3/2003 | Hauert et al. |
| 6,545,382 B1 | 4/2003 | Bennett |
| 6,549,381 B1 | 4/2003 | Watson |
| 6,560,065 B1 | 5/2003 | Yang et al. |
| 6,571,460 B1 | 6/2003 | Casey et al. |
| 6,574,073 B1 | 6/2003 | Hauert et al. |
| 6,580,574 B1 | 6/2003 | Codilian |
| 6,594,111 B1 | 7/2003 | Oveyssi et al. |
| 6,603,620 B1 | 8/2003 | Berding |
| 6,618,222 B1 | 9/2003 | Watkins et al. |
| 6,624,966 B1 | 9/2003 | Gustafson et al. |
| 6,624,980 B1 | 9/2003 | Watson et al. |
| 6,624,983 B1 | 9/2003 | Berding |
| 6,628,473 B1 | 9/2003 | Codilian et al. |
| 6,654,200 B1 | 11/2003 | Alexander et al. |
| 6,657,811 B1 | 12/2003 | Codilian |
| 6,661,597 B1 | 12/2003 | Hanan et al. |
| 6,661,603 B1 | 12/2003 | Watkins et al. |
| 6,674,600 B1 | 1/2004 | Codilian et al. |
| 6,690,637 B1 | 2/2004 | Codilian |
| 6,693,767 B1 | 2/2004 | Butler |
| 6,693,773 B1 | 2/2004 | Sassine |
| 6,697,217 B1 | 2/2004 | Codilian |
| 6,698,286 B1 | 3/2004 | Little et al. |
| 6,700,736 B1 | 3/2004 | Wu et al. |
| 6,704,167 B1 | 3/2004 | Scura et al. |
| 6,707,637 B1 | 3/2004 | Codilian et al. |
| 6,707,641 B1 | 3/2004 | Oveyssi et al. |
| 6,710,980 B1 | 3/2004 | Hauert et al. |
| 6,710,981 B1 | 3/2004 | Oveyssi et al. |
| 6,728,062 B1 | 4/2004 | Ou-Yang et al. |
| 6,728,063 B1 | 4/2004 | Gustafson et al. |
| 6,731,470 B1 | 5/2004 | Oveyssi |
| 6,735,033 B1 | 5/2004 | Codilian et al. |
| 6,741,428 B1 | 5/2004 | Oveyssi |
| 6,751,051 B1 | 6/2004 | Garbarino |
| 6,754,042 B1 | 6/2004 | Chiou et al. |
| 6,757,132 B1 | 6/2004 | Watson et al. |
| 6,759,784 B1 | 7/2004 | Gustafson et al. |
| 6,778,360 B2 * | 8/2004 | Gillis et al. ............... 360/234.5 |
| 6,781,780 B1 | 8/2004 | Codilian |
| 6,781,787 B1 | 8/2004 | Codilian et al. |
| 6,781,791 B1 | 8/2004 | Griffin et al. |
| 6,790,066 B1 | 9/2004 | Klein |
| 6,791,791 B1 | 9/2004 | Alfred et al. |
| 6,791,801 B1 | 9/2004 | Oveyssi |
| 6,795,262 B1 | 9/2004 | Codilian et al. |
| 6,798,603 B1 | 9/2004 | Singh et al. |
| 6,801,389 B1 | 10/2004 | Berding et al. |
| 6,801,404 B1 | 10/2004 | Oveyssi |
| 6,816,342 B1 | 11/2004 | Oveyssi |
| 6,816,343 B1 | 11/2004 | Oveyssi |
| 6,825,622 B1 | 11/2004 | Ryan et al. |
| 6,826,009 B1 | 11/2004 | Scura et al. |
| 6,831,810 B1 | 12/2004 | Butler et al. |
| 6,839,199 B1 | 1/2005 | Alexander, Jr. et al. |
| 6,844,996 B1 | 1/2005 | Berding et al. |
| 6,847,504 B1 | 1/2005 | Bennett et al. |
| 6,847,506 B1 | 1/2005 | Lin et al. |
| 6,856,491 B1 | 2/2005 | Oveyssi |
| 6,856,492 B2 | 2/2005 | Oveyssi |
| 6,862,154 B1 | 3/2005 | Subrahmanyam et al. |
| 6,862,156 B1 | 3/2005 | Lin et al. |
| 6,862,176 B1 | 3/2005 | Codilian et al. |
| 6,865,049 B1 | 3/2005 | Codilian et al. |
| 6,865,055 B1 | 3/2005 | Ou-Yang et al. |
| 6,867,946 B1 | 3/2005 | Berding et al. |
| 6,867,950 B1 | 3/2005 | Lin |
| 6,876,514 B1 | 4/2005 | Little |
| 6,879,466 B1 | 4/2005 | Oveyssi et al. |
| 6,888,697 B1 | 5/2005 | Oveyssi |
| 6,888,698 B1 | 5/2005 | Berding et al. |
| 6,891,696 B1 | 5/2005 | Ou-Yang et al. |
| 6,898,052 B1 | 5/2005 | Oveyssi |
| 6,900,961 B1 | 5/2005 | Butler |
| 6,906,880 B1 | 6/2005 | Codilian |
| 6,906,897 B1 | 6/2005 | Oveyssi |
| 6,908,330 B2 | 6/2005 | Garrett et al. |
| 6,922,308 B1 | 7/2005 | Butler |
| 6,930,848 B1 | 8/2005 | Codilian et al. |
| 6,930,857 B1 | 8/2005 | Lin et al. |
| 6,934,126 B1 | 8/2005 | Berding et al. |
| 6,937,444 B1 | 8/2005 | Oveyssi |
| 6,940,698 B2 | 9/2005 | Lin et al. |
| 6,941,642 B1 | 9/2005 | Subrahmanyam et al. |
| 6,947,251 B1 | 9/2005 | Oveyssi et al. |
| 6,950,275 B1 | 9/2005 | Ali et al. |
| 6,950,284 B1 | 9/2005 | Lin |
| 6,952,318 B1 | 10/2005 | Ngo |
| 6,954,329 B1 | 10/2005 | Ojeda et al. |
| 6,958,884 B1 | 10/2005 | Ojeda et al. |
| 6,958,890 B1 | 10/2005 | Lin et al. |
| 6,961,212 B1 | 11/2005 | Gustafson et al. |
| 6,961,218 B1 | 11/2005 | Lin et al. |
| 6,963,469 B1 | 11/2005 | Gustafson et al. |
| 6,965,500 B1 | 11/2005 | Hanna et al. |
| 6,967,800 B1 | 11/2005 | Chen et al. |
| 6,967,804 B1 | 11/2005 | Codilian |
| 6,970,329 B1 | 11/2005 | Oveyssi et al. |
| 6,972,924 B1 | 12/2005 | Chen et al. |
| 6,972,926 B1 | 12/2005 | Codilian |
| 6,975,476 B1 | 12/2005 | Berding |
| 6,979,931 B1 | 12/2005 | Gustafson et al. |
| 6,980,391 B1 | 12/2005 | Haro |
| 6,980,401 B1 | 12/2005 | Narayanan et al. |
| 6,982,853 B1 | 1/2006 | Oveyssi et al. |
| 6,989,953 B1 | 1/2006 | Codilian |
| 6,990,727 B1 | 1/2006 | Butler et al. |
| 6,996,893 B1 | 2/2006 | Ostrander et al. |
| 7,000,309 B1 | 2/2006 | Klassen et al. |
| 7,006,324 B1 | 2/2006 | Oveyssi et al. |
| 7,013,731 B1 | 3/2006 | Szeremeta et al. |
| 7,031,104 B1 | 4/2006 | Butt et al. |
| 7,035,053 B1 | 4/2006 | Oveyssi et al. |
| 7,050,270 B1 | 5/2006 | Oveyssi et al. |
| 7,057,852 B1 | 6/2006 | Butler et al. |
| 7,062,837 B1 | 6/2006 | Butler |
| 7,064,921 B1 | 6/2006 | Yang et al. |
| 7,064,922 B1 | 6/2006 | Alfred et al. |
| 7,064,932 B1 | 6/2006 | Lin et al. |
| 7,085,098 B1 | 8/2006 | Yang et al. |
| 7,085,108 B1 | 8/2006 | Oveyssi et al. |
| 7,092,216 B1 | 8/2006 | Chang et al. |
| 7,092,251 B1 | 8/2006 | Henry |
| 7,099,099 B1 | 8/2006 | Codilian et al. |
| 7,113,371 B1 | 9/2006 | Hanna et al. |
| 7,142,397 B1 | 11/2006 | Venk |
| 7,145,753 B1 | 12/2006 | Chang et al. |
| RE39,478 E | 1/2007 | Hatch et al. |
| 7,161,768 B1 | 1/2007 | Oveyssi |
| 7,161,769 B1 | 1/2007 | Chang et al. |
| 7,180,711 B1 | 2/2007 | Chang et al. |
| 7,193,819 B1 | 3/2007 | Chen et al. |
| 7,209,317 B1 | 4/2007 | Berding et al. |
| 7,209,319 B1 | 4/2007 | Watkins et al. |
| D542,289 S | 5/2007 | Diebel |
| 7,212,377 B1 | 5/2007 | Ou-Yang et al. |
| 7,215,513 B1 | 5/2007 | Chang et al. |
| 7,215,514 B1 | 5/2007 | Yang et al. |
| 7,224,551 B1 | 5/2007 | Ou-Yang et al. |
| D543,981 S | 6/2007 | Diebel |
| 7,227,725 B1 | 6/2007 | Chang et al. |
| 7,239,475 B1 | 7/2007 | Lin et al. |
| 7,271,978 B1 | 9/2007 | Santini et al. |

(56) References Cited

U.S. PATENT DOCUMENTS

| | | |
|---|---|---|
| 7,274,534 B1 | 9/2007 | Choy et al. |
| 7,280,311 B1 | 10/2007 | Ou-Yang et al. |
| 7,280,317 B1 | 10/2007 | Little et al. |
| 7,280,319 B1 | 10/2007 | McNab |
| 7,292,406 B1 | 11/2007 | Huang |
| 7,298,584 B1 | 11/2007 | Yamada et al. |
| 7,327,537 B1 | 2/2008 | Oveyssi |
| 7,339,268 B1 | 3/2008 | Ho et al. |
| 7,342,746 B1 | 3/2008 | Lin |
| RE40,203 E | 4/2008 | Hatch et al. |
| 7,353,524 B1 | 4/2008 | Lin et al. |
| 7,369,368 B1 | 5/2008 | Mohajerani |
| 7,372,670 B1 | 5/2008 | Oveyssi |
| 7,375,929 B1 | 5/2008 | Chang et al. |
| 7,379,266 B1 | 5/2008 | Ou-Yang et al. |
| 7,381,904 B1 | 6/2008 | Codilian |
| 7,385,784 B1 | 6/2008 | Berding et al. |
| 7,388,731 B1 | 6/2008 | Little et al. |
| 7,420,771 B1 | 9/2008 | Hanke et al. |
| 7,434,987 B1 | 10/2008 | Gustafson et al. |
| 7,436,625 B1 | 10/2008 | Chiou et al. |
| 7,440,234 B1 | 10/2008 | Cheng et al. |
| 7,477,488 B1 | 1/2009 | Zhang et al. |
| 7,477,489 B1 | 1/2009 | Chen et al. |
| 7,484,291 B1 | 2/2009 | Ostrander et al. |
| 7,505,231 B1 | 3/2009 | Golgolab et al. |
| 7,529,064 B1 | 5/2009 | Huang et al. |
| 7,538,981 B1 | 5/2009 | Pan |
| 7,551,402 B2 | 6/2009 | Hayakawa |
| 7,561,374 B1 | 7/2009 | Codilian et al. |
| 7,564,653 B2 * | 7/2009 | Ohta et al. ............... 360/254.8 |
| 7,567,410 B1 | 7/2009 | Zhang et al. |
| 7,576,955 B1 | 8/2009 | Yang et al. |
| 7,593,181 B1 | 9/2009 | Tsay et al. |
| 7,605,999 B1 | 10/2009 | Kung et al. |
| 7,609,486 B1 | 10/2009 | Little |
| 7,610,672 B1 | 11/2009 | Liebman |
| 7,633,721 B1 | 12/2009 | Little et al. |
| 7,633,722 B1 | 12/2009 | Larson et al. |
| 7,656,609 B1 | 2/2010 | Berding et al. |
| 7,660,075 B1 | 2/2010 | Lin et al. |
| 7,672,083 B1 | 3/2010 | Yu et al. |
| 7,684,155 B1 | 3/2010 | Huang et al. |
| 7,686,555 B1 | 3/2010 | Larson et al. |
| 7,709,078 B1 | 5/2010 | Sevier et al. |
| 7,715,149 B1 | 5/2010 | Liebman et al. |
| 7,729,091 B1 | 6/2010 | Huang et al. |
| 7,751,145 B1 | 7/2010 | Lin et al. |
| 7,751,151 B2 * | 7/2010 | Son ........................ 360/256 |
| 7,768,745 B2 * | 8/2010 | Okada et al. ............ 360/254.8 |
| 7,826,177 B1 | 11/2010 | Zhang et al. |
| 7,852,601 B1 | 12/2010 | Little |
| 7,864,488 B1 | 1/2011 | Pan |
| 7,898,770 B1 | 3/2011 | Zhang et al. |
| 7,903,369 B1 | 3/2011 | Codilian et al. |
| 7,907,369 B1 | 3/2011 | Pan |
| 7,911,742 B1 | 3/2011 | Chang et al. |
| 7,926,167 B1 | 4/2011 | Liebman et al. |
| 7,957,095 B1 | 6/2011 | Tsay et al. |
| 7,957,102 B1 | 6/2011 | Watson et al. |
| 7,961,436 B1 | 6/2011 | Huang et al. |
| 8,004,782 B1 | 8/2011 | Nojaba et al. |
| 8,009,384 B1 | 8/2011 | Little |
| 8,018,687 B1 | 9/2011 | Little et al. |
| 8,031,431 B1 | 10/2011 | Berding et al. |
| 8,064,168 B1 | 11/2011 | Zhang et al. |
| 8,064,170 B1 | 11/2011 | Pan |
| 8,068,314 B1 | 11/2011 | Pan et al. |
| 8,081,401 B1 | 12/2011 | Huang et al. |
| 8,100,017 B1 | 1/2012 | Blick et al. |
| 8,102,627 B2 | 1/2012 | Muraki et al. |
| 8,116,038 B1 | 2/2012 | Zhang et al. |
| 8,125,740 B1 | 2/2012 | Yang et al. |
| 8,142,671 B1 | 3/2012 | Pan |
| 8,156,633 B1 | 4/2012 | Foisy |
| 8,159,785 B1 | 4/2012 | Lee et al. |
| 8,189,298 B1 | 5/2012 | Lee et al. |
| 8,194,348 B2 | 6/2012 | Jacoby et al. |
| 8,194,354 B1 | 6/2012 | Zhang et al. |
| 8,194,355 B1 | 6/2012 | Pan et al. |
| 8,203,806 B2 | 6/2012 | Larson et al. |
| 8,223,453 B1 | 7/2012 | Norton et al. |
| 8,228,631 B1 | 7/2012 | Tsay et al. |
| 8,233,239 B1 | 7/2012 | Teo et al. |
| 8,248,733 B1 | 8/2012 | Radavicius et al. |
| 8,259,417 B1 | 9/2012 | Ho et al. |
| 8,274,760 B1 | 9/2012 | Zhang et al. |
| 8,276,256 B1 | 10/2012 | Zhang et al. |
| 8,279,560 B1 | 10/2012 | Pan |
| 8,284,514 B1 | 10/2012 | Garbarino |
| 8,289,646 B1 | 10/2012 | Heo et al. |
| 8,300,352 B1 | 10/2012 | Larson et al. |
| 8,305,708 B2 | 11/2012 | Tacklind |
| 8,320,086 B1 | 11/2012 | Moradnouri et al. |
| 8,322,021 B1 | 12/2012 | Berding et al. |
| 8,345,387 B1 | 1/2013 | Nguyen |
| 8,363,351 B1 | 1/2013 | Little |
| 8,369,044 B2 | 2/2013 | Howie et al. |
| 8,411,389 B1 | 4/2013 | Tian et al. |
| 8,416,522 B1 | 4/2013 | Schott et al. |
| 8,416,534 B1 | 4/2013 | Heo et al. |
| 8,422,171 B1 | 4/2013 | Guerini |
| 8,422,175 B1 | 4/2013 | Oveyssi |
| 8,432,641 B1 | 4/2013 | Nguyen |
| 8,437,101 B1 | 5/2013 | German et al. |
| 8,438,721 B1 | 5/2013 | Sill |
| 8,446,688 B1 | 5/2013 | Quines et al. |
| 8,451,559 B1 | 5/2013 | Berding et al. |
| 8,467,153 B1 | 6/2013 | Pan et al. |
| 8,472,131 B1 | 6/2013 | Ou-Yang et al. |
| 8,477,460 B1 | 7/2013 | Liebman |
| 8,488,270 B2 | 7/2013 | Brause et al. |
| 8,488,280 B1 | 7/2013 | Myers et al. |
| 8,493,690 B1 * | 7/2013 | Ono .................. G11B 21/22 360/254.8 |
| 8,499,652 B1 | 8/2013 | Tran et al. |
| 8,514,514 B1 | 8/2013 | Berding et al. |
| 8,530,032 B1 | 9/2013 | Sevier et al. |
| 8,531,799 B2 | 9/2013 | Greminger |
| 8,542,465 B2 | 9/2013 | Liu et al. |
| 8,547,664 B1 | 10/2013 | Foisy et al. |
| 8,553,356 B1 | 10/2013 | Heo et al. |
| 8,553,366 B1 | 10/2013 | Hanke |
| 8,553,367 B1 | 10/2013 | Foisy et al. |
| 8,616,900 B1 | 12/2013 | Lion |
| 8,665,555 B1 | 3/2014 | Young et al. |
| 8,667,667 B1 | 3/2014 | Nguyen et al. |
| 8,693,139 B2 | 4/2014 | Tian et al. |
| 8,693,140 B1 | 4/2014 | Weiher et al. |
| 8,699,179 B1 | 4/2014 | Golgolab et al. |
| 8,702,998 B1 | 4/2014 | Guerini |
| 8,705,201 B2 | 4/2014 | Casey et al. |
| 8,705,209 B2 | 4/2014 | Seymour et al. |
| 8,717,706 B1 | 5/2014 | German et al. |
| 8,743,509 B1 | 6/2014 | Heo et al. |
| 8,755,148 B1 | 6/2014 | Howie et al. |
| 8,756,776 B1 | 6/2014 | Chen et al. |
| 8,760,800 B1 | 6/2014 | Brown et al. |
| 8,760,814 B1 | 6/2014 | Pan et al. |
| 8,760,816 B1 | 6/2014 | Myers et al. |
| 8,773,812 B1 | 7/2014 | Gustafson et al. |
| 8,780,491 B1 | 7/2014 | Perlas et al. |
| 8,780,504 B1 | 7/2014 | Teo et al. |
| 8,792,205 B1 | 7/2014 | Boye-Doe et al. |
| 8,797,677 B2 | 8/2014 | Heo et al. |
| 8,797,689 B1 | 8/2014 | Pan et al. |
| 8,824,095 B1 | 9/2014 | Dougherty |
| 8,824,098 B1 | 9/2014 | Huang et al. |
| 2006/0007600 A1 * | 1/2006 | Suzuki ..................... 360/255 |
| 2008/0037176 A1 * | 2/2008 | Matsuda ............. G11B 21/22 360/254.8 |

(56) References Cited

U.S. PATENT DOCUMENTS

| | | | | |
|---|---|---|---|---|
| 2008/0204925 A1* | 8/2008 | Ohta | ............ | G11B 5/54 360/75 |
| 2008/0285176 A1* | 11/2008 | Arikawa | ............ | G11B 5/54 360/254.8 |
| 2009/0303637 A1* | 12/2009 | Larson et al. | ............ | 360/254.8 |
| 2010/0061012 A1* | 3/2010 | Seki | ............ | G11B 21/22 360/99.06 |
| 2011/0212281 A1 | 9/2011 | Jacoby et al. | | |
| 2013/0038964 A1 | 2/2013 | Garbarino et al. | | |
| 2013/0091698 A1 | 4/2013 | Banshak, Jr. et al. | | |
| 2013/0155546 A1 | 6/2013 | Heo et al. | | |
| 2013/0290988 A1 | 10/2013 | Watson et al. | | |

\* cited by examiner

MAGNETIC HEAD SEPARATOR CONNECTED TO A RAMP

CROSS-REFERENCE TO RELATED APPLICATION

This application claims the benefit of U.S. Provisional Application Ser. No. 61/952,611 filed on Mar. 13, 2014, which is expressly incorporated by reference herein in its entirety.

BACKGROUND

A hard disk drive includes a rotatable storage disk, with magnetic reader heads and writer heads that can be placed in park when the device is not actively reading or writing. A head assembly of reader and writer heads is positioned on a slider, which is a base substrate structure for the head assembly. A ramp is a structure designed to guide and seat a suspension arm for the head assembly when parking. An armature holding the head assembly rotates to an end position toward the ramp, allowing a tip assembly to engage with the ramp, with the head assembly kept at a clearance gap from the ramp. While in park, an opposing slider and head assembly, used for reading and writing on the opposite side of the storage disk, resides below the first slider and head assembly. In order to protect the opposing sliders from clashing with each other upon a shock event (e.g., if the device is dropped or bumped during assembly or after assembly), a separator fin extends outward from the ramp into the space between the parked sliders. Should the opposing sliders clash together, there may be chipping or damage to either of the sliders or magnetic head assemblies.

BRIEF DESCRIPTION OF THE DRAWINGS

Various aspects of the present invention will now be presented in the detailed description by way of example, and not by way of limitation, with reference to the accompanying drawings, wherein.

DETAILED DESCRIPTION

The detailed description set forth below in connection with the appended drawings is intended as a description of various exemplary embodiments and is not intended to represent the only embodiments that may be practiced. The detailed description includes specific details for the purpose of providing a thorough understanding of the embodiments. However, it will be apparent to those skilled in the art that the embodiments may be practiced without these specific details. In some instances, well-known structures and components are shown in block diagram form in order to avoid obscuring the concepts of the embodiments. Acronyms and other descriptive terminology may be used merely for convenience and clarity and are not intended to limit the scope of the embodiments.

The various exemplary embodiments illustrated in the drawings may not be drawn to scale. Rather, the dimensions of the various features may be expanded or reduced for clarity. In addition, some of the drawings may be simplified for clarity. Thus, the drawings may not depict all of the components of a given apparatus.

Various embodiments will be described herein with reference to drawings that are schematic illustrations of idealized configurations. As such, variations from the shapes of the illustrations as a result of manufacturing techniques and/or tolerances, for example, are to be expected. Thus, the various embodiments presented throughout this disclosure should not be construed as limited to the particular shapes of elements illustrated and described herein but are to include deviations in shapes that result, for example, from manufacturing. By way of example, an element illustrated or described as having rounded or curved features at its edges may instead have straight edges. Thus, the elements illustrated in the drawings are schematic in nature and their shapes are not intended to illustrate the precise shape of an element and are not intended to limit the scope of the described embodiments.

The word "exemplary" is used herein to mean serving as an example, instance, or illustration. Any embodiment described herein as "exemplary" is not necessarily to be construed as preferred or advantageous over other embodiments. Likewise, the term "embodiment" of an apparatus or method does not require that all embodiments include the described components, structure, features, functionality, processes, advantages, benefits, or modes of operation.

As used herein, the term "about" followed by a numeric value means within engineering tolerance of the provided value.

In the following detailed description, various aspects of the present invention will be presented in the context of a ramp assembly used to park a magnetic head assembly when idle in a hard disk drive (HDD).

An aspect of an apparatus includes a ramp configured to guide and hold a magnetic head assembly in place when parked; and a separator coupled to the ramp, the separator being suspended between a top suspension load beam and a bottom suspension load beam to prevent a top magnetic head assembly from contacting a bottom magnetic head assembly during a shock event when the magnetic head assembly is parked on the ramp.

Figure 1:
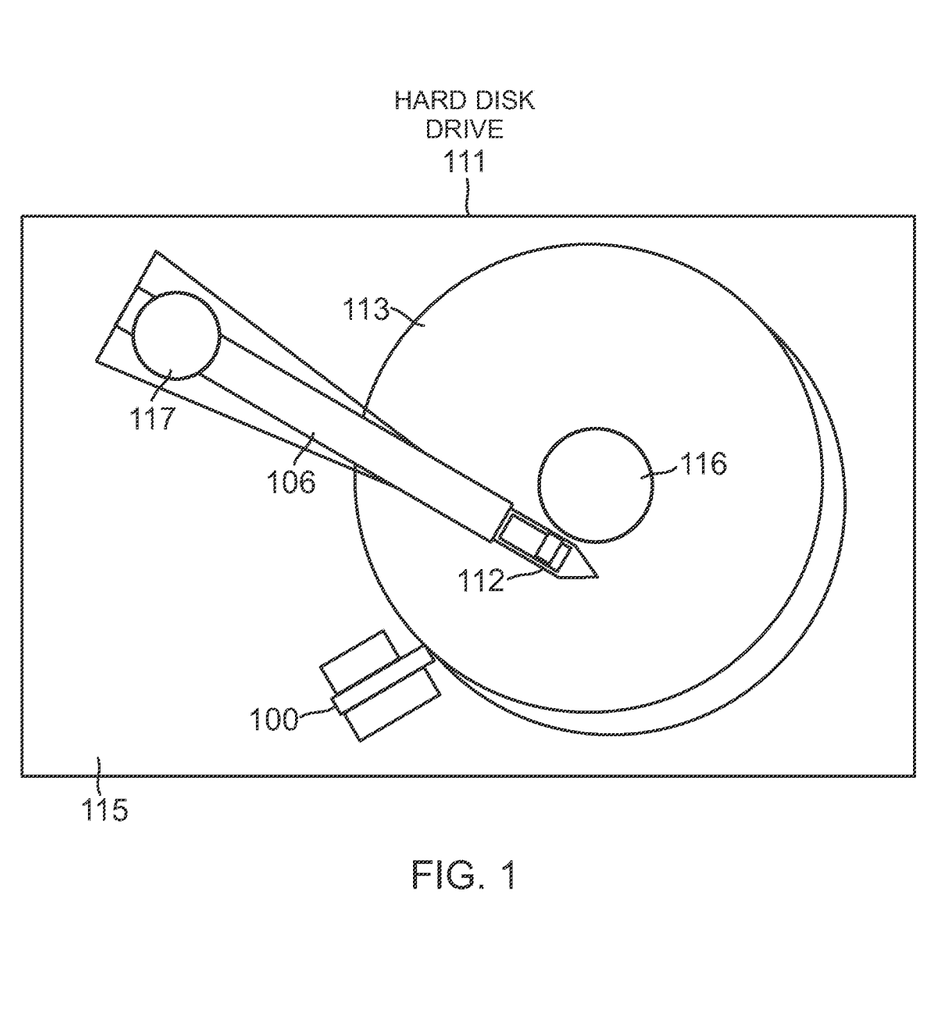
FIG. 1 shows a diagram of an exemplary hard disk drive.

FIG. 1 shows a hard disk drive 111 including a disk drive base 114, at least one rotatable storage disk 113 (such as a magnetic disk, magneto-optical disk, or optical disk), and a spindle motor 116 attached to the base 115 for rotating the disk 113. The spindle motor 116 typically includes a rotating hub on which one or more disks 113 may be mounted and clamped, a magnet attached to the hub, and a stator. At least one suspension arm 106 supports at least one head gimbal assembly (HGA) 112 that holds a slider with a magnetic head assembly of writer and reader heads. The gimbal of the HGA 112 is a bracket structure with thin metallic elements that are prone to deformation damage upon contact. A ramp assembly 100 is affixed to the base 115, and provides a surface for a lift tab at the tip of the suspension arm 108 to rest when the HGA 112 is parked (i.e., when the writing and reading heads are idle). During a recording operation of the disk drive 111, the suspension arm 108 rotates at the pivot 117, disengaging from the ramp assembly 100, and moves the position of the HGA 112 to a desired information track on the rotating disk 113. An actuator arm of the suspension arm is controlled by piezoelectric (PZT) actuator elements for secondary fine tuned movement of the head assembly for controlling the position for writing to a particular data track on the disk 113. The PZT actuator elements are susceptible to damage upon a shock event. A typical hard disk drive 111 uses double sided disks 113 to allow read/write operation on both sides of the disk 113. As such, a second, opposing HGA 112 supported by a second suspension arm 108 (both are not visible in FIG. 1) may be arranged on the underside of the disk 113. The ramp assembly 100 may be configured with a lower surface that accepts a lift tab at the tip of the second suspension arm 108 when the second HGA 112 is parked.

Figure 2A:
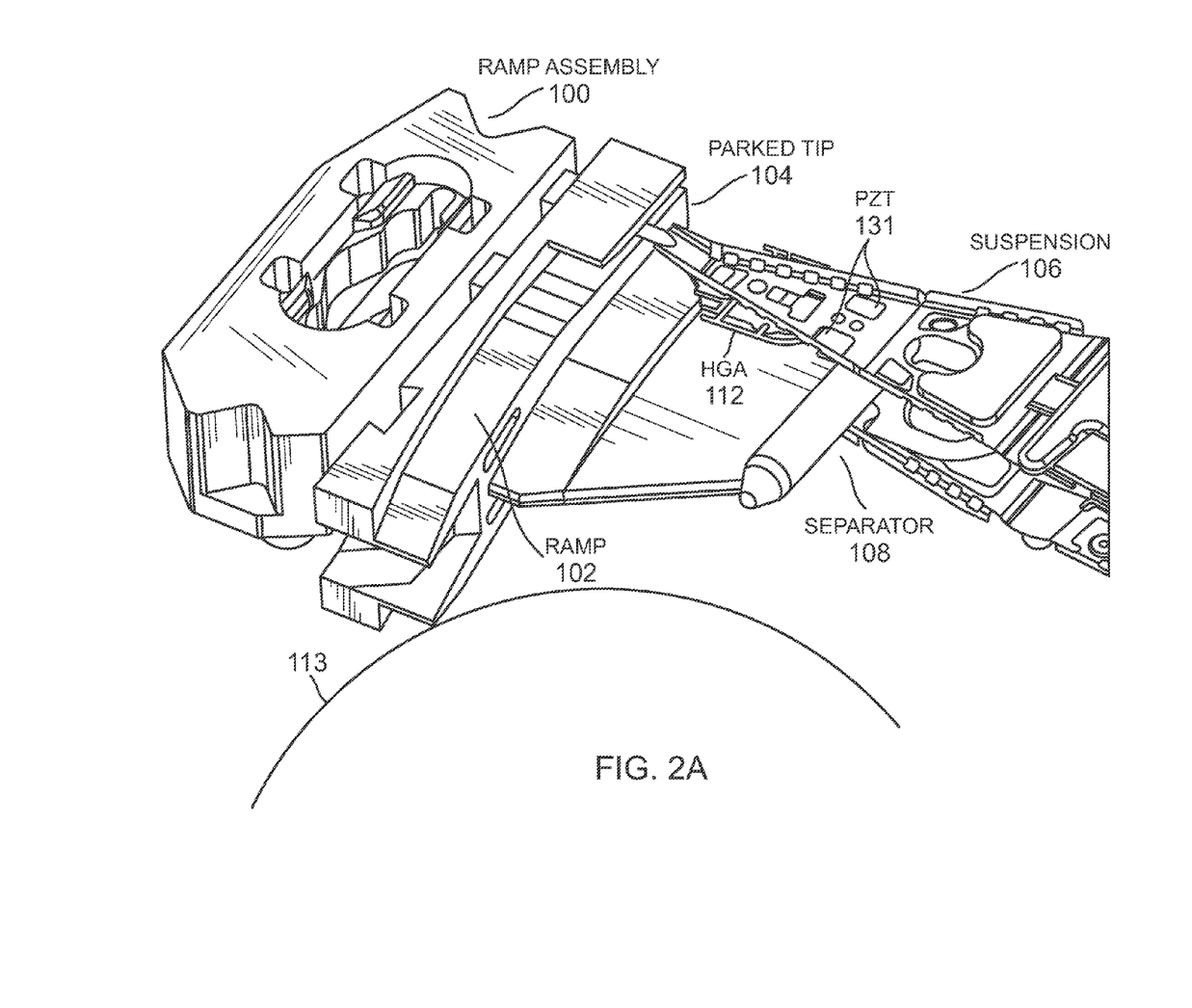
FIGS. 2A and 2B show a top perspective view and a side view, respectively, of an exemplary embodiment for a ramp assembly with a separator structure protecting a pair of sliders parked on the ramp.
Figure 2B:
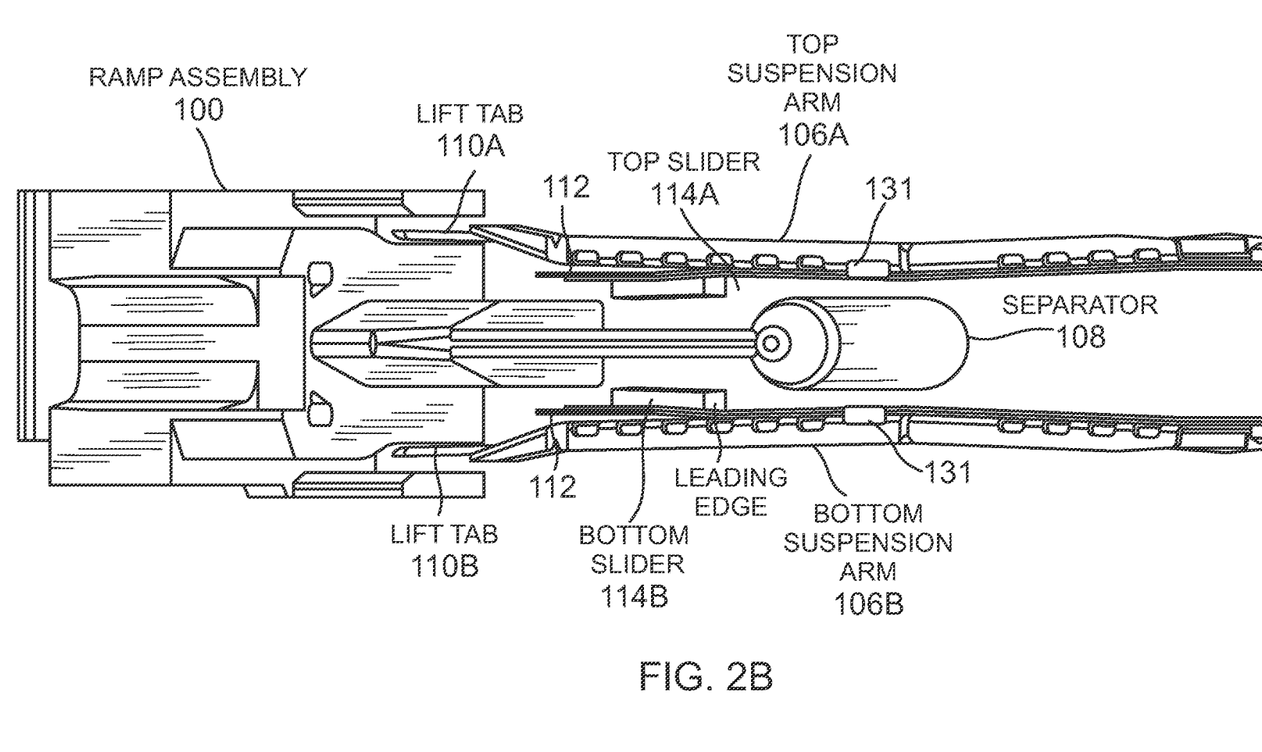

FIGS. 2A and 2B illustrate exemplary embodiments of a ramp assembly 200. FIG. 2A shows a top perspective view of an exemplary ramp assembly 100 with the suspension arm 106 parked on the ramp 102. FIG. 2B shows a side view of the same assembly 200 with suspension arm 106 parked on the ramp 102. The top slider 114A is affixed to the HGA 112, which is underneath and supported by a gimbal of HGA 112 and supported by suspension 106. A separator 108 is shown at the outer edge of the ramp assembly 100. As shown in FIG. 2A, the separator 108 may be configured with a shape length that conforms to the adjacent ramp 102 for providing protection between the opposing sliders and gimbals of HGA 112 along the length of the ramp 102 as the suspension 106 approaches and departs the ramp 102 (i.e., loading and unloading the magnetic head). During loading, the lift tabs 110A, 110B make first contact with the ramp 102, at which point the separator 108 has been straddled by the top and bottom sliders 114A, 114B. The length of the separator 108 may be approximately equivalent to the length of the ramp 102, with a minimum length corresponding to the boundary of the suspended sliders, such that when the lift tabs 110A, 110B are in contact with the ramp 102 (i.e., while the suspension arm is loading onto the ramp or unloading from the ramp, or fully engaged in the parked position), the sliders 114A, 114B and gimbals of HGA 112 are protected by the separator 108. The length of the separator 108 may have a maximum length that relates to the boundary of the storage disk 113, such that the tip of separator 108 extends toward the storage disk 113 without contacting the edge of the storage disk 113 with a clearance gap for safe measure. PZT elements 131, which may also be protected by the separator 108, by suspending the separator 108 beyond the radial positions of the PZT elements 131.

Figure 3:
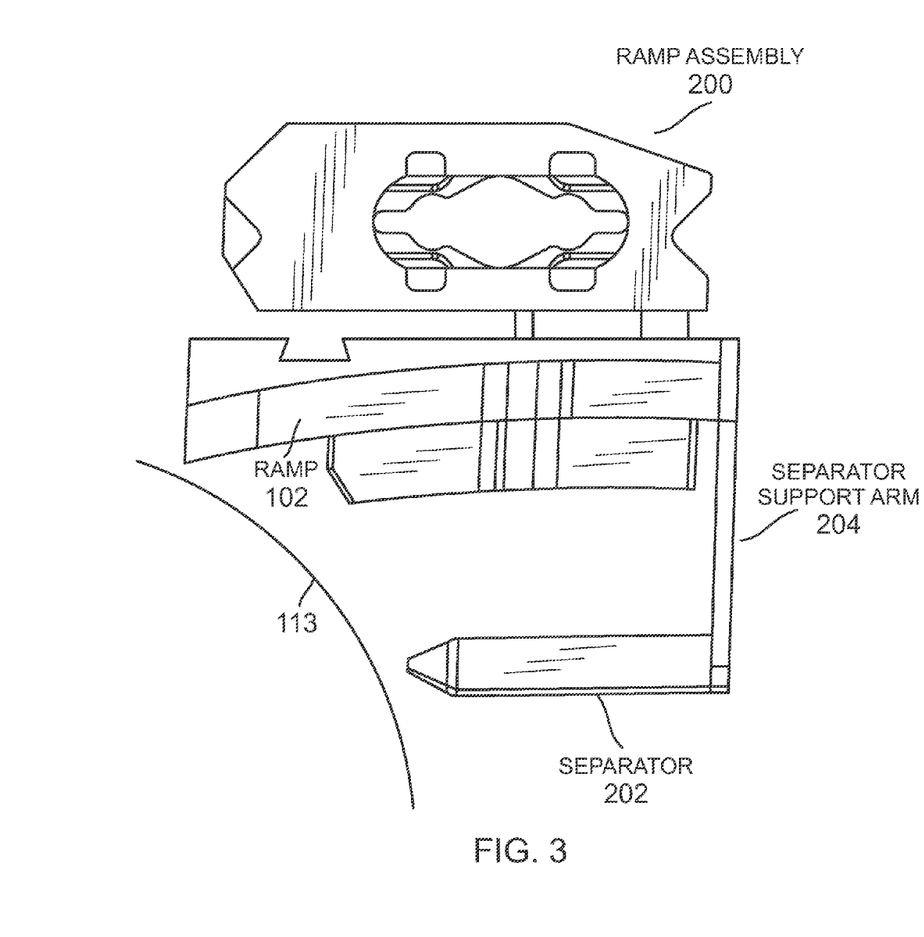
FIG. 3 shows an alternative exemplary embodiment for a ramp assembly with a separator having a minimal arm for coupling to the ramp.

FIG. 2B shows a side view of the same ramp assembly 100 as shown in FIG. 2A with the suspension 106A parked on the ramp 102. In this view as shown in FIG. 2B, both the top suspension arm 106A and bottom suspension arm 106B are visible, which support a top slider 114A and bottom slider 114B, respectively. Also shown is the parked lift tab 110 of the top suspension arm 106A, which rests on the surface of ramp 102. The separator 108 is arranged between the top suspension arm 106A and the bottom the top suspension arm 106B, adjacent to the leading edges of the sliders 114A, 114B. The leading edges of the sliders 114A, 114B are oriented on the suspension arm 106A, 106B to act as an inlet for an air bearing surface created by the rotation of the hard disk. This placement of the separator 108 prevents the two opposing sliders 114A, 114B from contacting each other during a shock event while in the parked position. As such, the gimbals of HGA 112 are also protected from potential damage by the separator 108. In this exemplary embodiment, the separator 108 is configured with a pin-like structure, but other shapes may be formed to serve an equivalent function. The position and side-to-side width of the separator 108 may be such that there is no interference with the sliders 114A, 114B when parking on ramp 102. The separator 108 may be configured to be supported by the ramp assembly 100 at a position extending out perpendicular and away from the ramp 102 that corresponds with the leading edge boundary of the suspended sliders 114A and 114B. The separator 108 may also be configured with a maximum thickness that provides clearance for the suspension arms 106A, 106B to pass above and below the separator 108 when being parked without contacting separator 108. The separator 108 may be configured with minimum thickness that prevents the sliders 114A, 114B from contacting each other when the suspension arms 106A, 106B flex during a shock event. As shown in FIG. 2B, the separator 108 provides a second point of contact in conjunction with the lift tab 110 at the ramp 102, allowing the sliders 114A, 114B to be safely bridged by the suspension arms 106A, 106B should there be any flexion of the suspension arms 106A, 106B caused by vibration or a shock event FIG. 3 shows an alternative exemplary embodiment for a ramp assembly 200 with a separator 202, in which the separator 202 may be supported without a fin structure, having instead a minimal separator support arm 204 to suspend the separator 202 from the body of the ramp assembly 200. In this exemplary embodiment, the separator 202 is shown configured with a pin-like structure, but other shapes may be formed to serve an equivalent function. The separator 202 may be configured with a shape length that conforms to the adjacent ramp 102 for providing protection between the opposing sliders 114A, 114B along the length of the ramp 102 as the suspension arms 106A, 106B approach and depart the ramp 102. The length of the separator 202 may be approximately equivalent to the length of the ramp 102, with a minimum length corresponding to the boundary of the suspended sliders 114A, 114B when parked. The position and side-to-side width of the separator 202 may be such that there is no interference with the sliders 114A, 114B when parking on ramp 102. The separator 202 may be configured to be supported by the ramp assembly 200 at a position extending out perpendicular and away from the ramp 102 that corresponds with the leading edge boundary of the suspended sliders 114A and 114B. The separator 202 may also be configured with a maximum thickness that provides clearance for the suspension arms 106A, 106B to pass above and below the separator 108 when being parked without contacting separator 202. The separator 202 may be configured with minimum thickness that prevents the sliders 114A, 114B from contacting each other when the suspension arms 106A, 106B flex during a shock event. The separator 202 may be configured with a maximum length such that the tip of separator 202 extends toward the edge of the storage disk 113, but does not touch the storage disk 113 with a clearance gap for safe measure.

Figure 4:
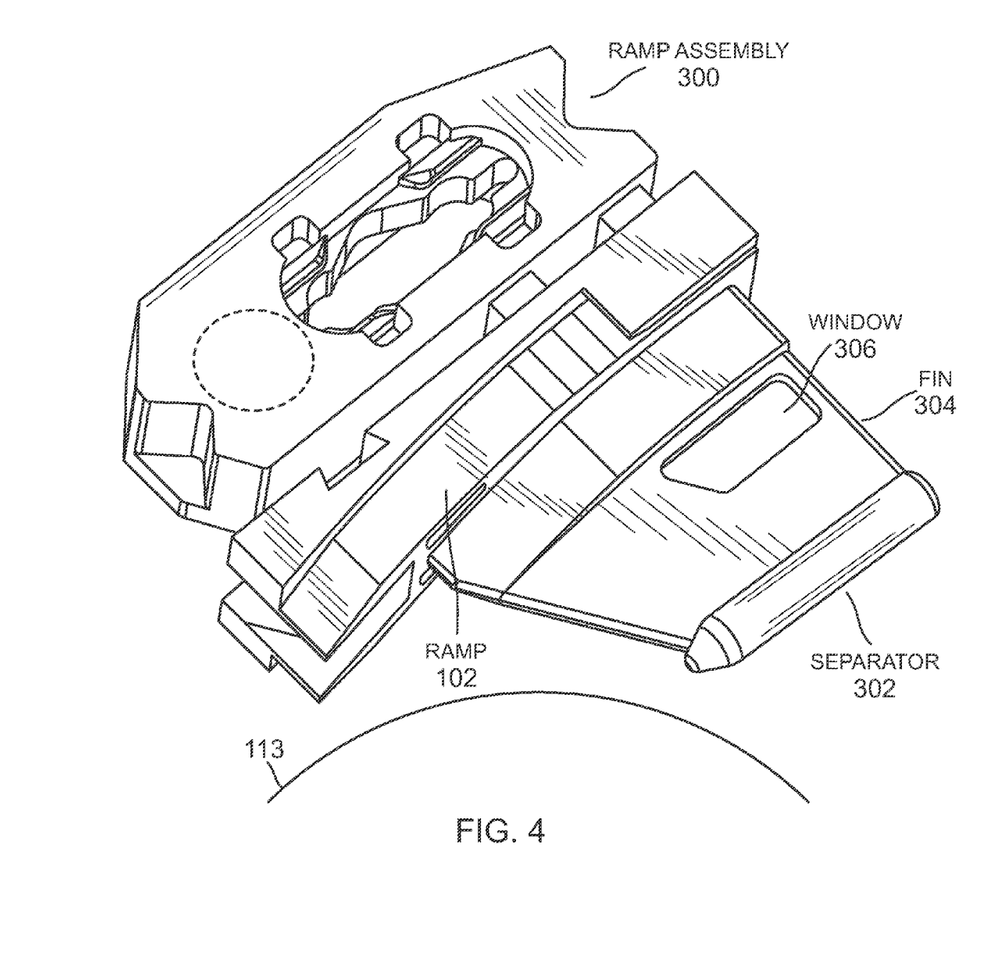
FIG. 4 shows an alternative exemplary embodiment for a ramp assembly with a separator having a fin support for coupling to the ramp.

FIG. 4 shows another alternative embodiment for the ramp assembly 300 with a separator 302, using a fin 304 to couple the separator 302 to the body of ramp assembly 300. The fine 304 may be configured with a window 306 such that no structure is present between the opposing sliders 114A, 114B when parked, providing maximum clearance between the sliders 114A, 114B. In this exemplary embodiment, the separator 302 is shown configured with a pin-like structure, but other shapes may be formed to serve an equivalent function. The separator 302 may be configured with a shape length that conforms to the adjacent ramp 102 for providing protection between the opposing sliders 114A, 114B along the length of the ramp 102 as the suspension arms 106A, 106B approach and depart the ramp 102. The length of the separator 302 may be approximately equivalent to the length of the ramp 102, with a minimum length corresponding to the boundary of the suspended sliders 114A, 114B when parked. The position and side-to-side width of the separator 302 may be such that there is no interference with the sliders 114A, 114B when parking on ramp 102. The separator 302 may be configured to be supported by the ramp assembly 300 at a position extending out perpendicular and away from the ramp 102 that corresponds with the leading edge boundary of the suspended sliders 114A and 114B. The separator 302 may also be configured with a maximum thickness that provides clearance for the suspension arms 106A, 106B to pass above and below the separator 302 when being parked without contacting separator 302. The separator 302 may be configured with minimum thickness that prevents the sliders 114A, 114B from contacting each other when the suspension arms 106A, 106B flex during a shock event. The separator 302 may be configured with a maximum length such that the tip of separator 302 extends toward the edge of the storage disk 113, but does not touch the storage disk 113 with a clearance gap for safe measure.

Figure 5:
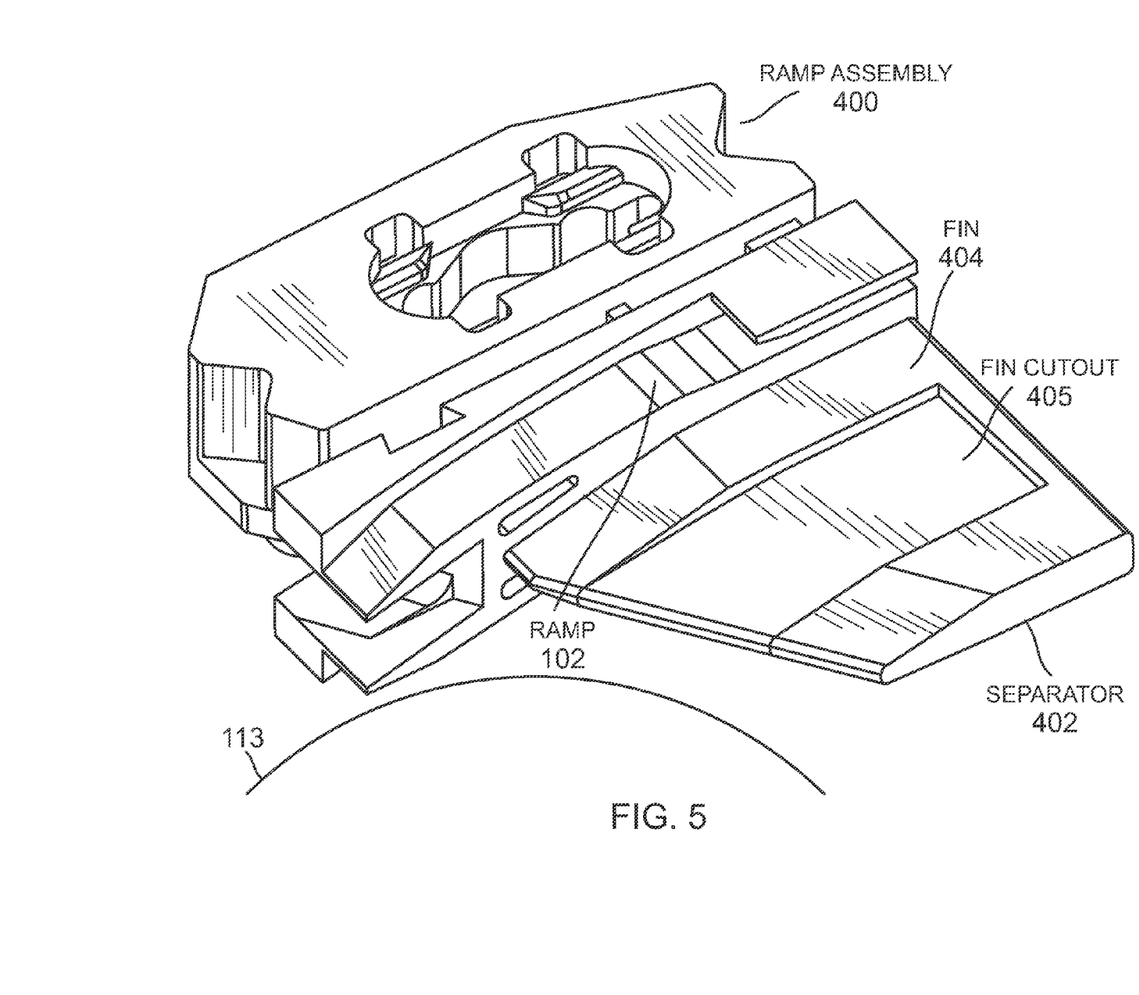
FIG. 5 shows an alternative exemplary embodiment for a ramp assembly with a separator having a support with a constant thickness.

FIG. 5 shows another exemplary embodiment for a ramp assembly 400 with a separator 402 supported by a fin 404 with cutout 405. The cutout feature provides additional clearance between the top slider 114A and the bottom slider 114B when parked. In this exemplary embodiment, the separator 402 is shown configured with a constant thickness conforming to the fin 404, but other shapes may be formed to serve an equivalent function. The separator 402 may be configured with a shape length that conforms to the adjacent ramp 102 for providing protection between the opposing sliders 114A, 114B along the length of the ramp 102 as the suspension arms 106A, 106B approach and depart the ramp 102. The length of the separator 402 may be approximately equivalent to the length of the ramp 102, with a minimum length corresponding to the boundary of the suspended sliders 114A, 114B when parked. The position and side-to-side width of the separator 402 may be such that there is no interference with the sliders 114A, 114B when parking on ramp 102. The separator 402 may be configured to be supported by the ramp assembly 400 at a position extending out perpendicular and away from the ramp 102 that corresponds with the leading edge boundary of the suspended sliders 114A and 114B. The separator 402 may also be configured with a maximum thickness that provides clearance for the suspension arms 106A, 106B to pass above and below the separator 402 when being parked without contacting separator 402. The separator 402 may be configured with minimum thickness that prevents the sliders 114A. 114B from contacting each other when the suspension arms 106A, 106B flex during a shock event. The separator 402 may be configured with a maximum length such that the tip of separator 402 extends toward the edge of the storage disk 113, but does not touch the storage disk 113 with a clearance gap for safe measure.

Figure 6:
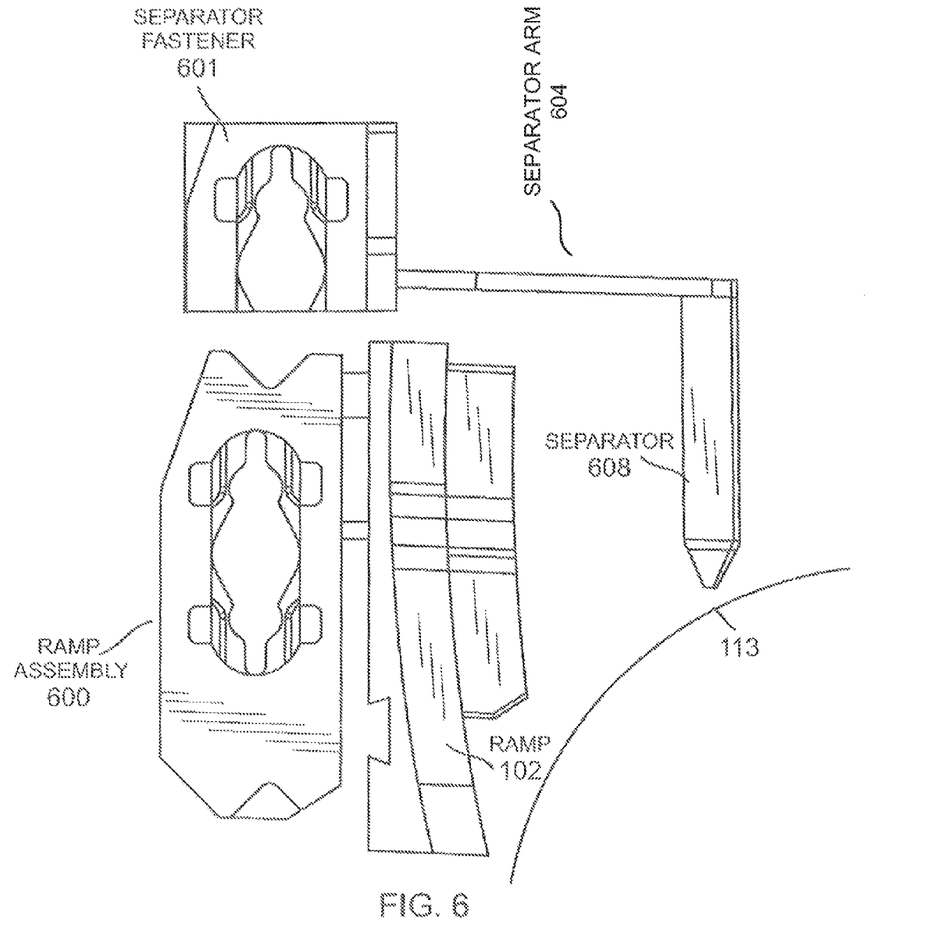
FIG. 6 shows an exemplary embodiment for a separator configured separate from the ramp assembly.

FIG. 6 shows an exemplary embodiment of a separator 608 having a separator support arm 604 with fastening means 601 separate to the ramp assembly 600. In this embodiment, the separator support arm 604 may include a fastening slot for fastening to the base 115 of hard disk drive 111. The separator 608 is shown in FIG. 6 with a pin-like structure, but may be configured as in any of the previous configurations described above with respect to FIG. 2A-FIG. 5. The separator 608 may be configured with a maximum length such that the tip of separator 608 extends toward the edge of the storage disk 113, but does not touch the storage disk 113 with a clearance gap for safe measure.

The various aspects of this disclosure are provided to enable one of ordinary skill in the art to practice the present invention. Various modifications to exemplary embodiments presented throughout this disclosure will be readily apparent to those skilled in the art, and the concepts disclosed herein may be extended to other devices. Thus, the claims are not intended to be limited to the various aspects of this disclosure, but are to be accorded the full scope consistent with the language of the claims. All structural and functional equivalents to the various components of the exemplary embodiments described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112(f) unless the element is expressly recited using the phrase "means for" or, in the case of a method claim, the element is recited using the phrase "step for."

What is claimed is:

1. A magnetic hard disk drive apparatus having a first suspension arm, a first slider having a magnetic head for recording to a first side of a disk, the first slider supported by the first suspension arm, a second suspension arm, and a second slider having a magnetic head for recording to a second side of the disk opposite of the first side, the second slider supported by the second suspension arm, the apparatus comprising:
 a ramp configured to guide and hold lift tabs of the first and second suspension arms in place when parked;
 a separator configured to be suspended between the first suspension arm and the second suspension arm in a position away from the ramp and beyond leading edges of the first and second sliders, such that leading edges of the first and second sliders are positioned between the separator and the ramp when the lift tabs are in contact with the ramp; and
 a connector configured to connect the separator to the ramp,
  wherein a thickness of the separator is greater than a thickness of the connector.

2. The apparatus of claim 1, wherein the separator is further configured to support the first suspension arm and the second suspension arm when a shock event imposes a force upon the first suspension arm toward the separator or a force upon the second suspension arm toward the separator.

3. The apparatus of claim 1, wherein the separator is further configured to have a maximum thickness that provides clearance to the first suspension arm and to the second suspension arm such that the separator is prevented from contacting the first suspension arm and the second suspension arm when the lift tabs are in contact with the ramp.

4. The apparatus of claim 1, wherein the separator is further configured to have a minimum thickness to prevent the first and second sliders from contacting each other in response to flexion of the first and second suspension arms when the lift tabs are in contact with the ramp.

5. The apparatus of claim 1, wherein each of the first and second sliders are attached to the first and second suspension arms by a first gimbal and a second gimbal, wherein the separator is further configured to have a minimum thickness to prevent deformation damage of the first and second gimbals when the lift tabs are in contact with the ramp.

6. The apparatus of claim 1, wherein each of the first and second suspension arms comprises piezoelectric (PZT)

actuators, wherein the separator is further configured to be positioned beyond the radial position of the PZT actuators on the first and second suspension arms when the lift tabs are in contact with the ramp.

7. The apparatus of claim 1, wherein the separator is coupled to the ramp.

8. The apparatus of claim 1, further comprising a base, wherein the separator is coupled to the base and further configured to be separate from the ramp.

9. The apparatus of claim 1, wherein the connector includes a fin that connects the separator to the ramp, wherein the separator is further configured to have a minimum thickness to prevent the first slider and the second slider from contacting the fin in response to flexion of the first and second suspension arms when the lift tabs are in contact with the ramp.

10. The apparatus of claim 9, wherein the fin comprises a window arranged such that no structure is present between the first slider and the second slider when the lift tabs are in contact with the ramp.

11. The apparatus of claim 9, wherein the fin comprises a cutout arranged to provide additional clearance between the fin and the first slider and between the fin and the second slider when the lift tabs are in contact with the ramp.

12. The apparatus of claim 1, wherein the connector includes a support arm that connects the separator to the ramp and arranged such that no structure is present between the first slider and the second slider when the lift tabs are in contact with the ramp.

13. A magnetic hard disk drive, comprising:
    a rotatable hard storage disk;
    a first slider comprising a magnetic head, the first slider supported by a first suspension arm;
    a second slider comprising a magnetic head, the second slider supported by a second suspension arm; and
    a ramp assembly comprising:
        a ramp configured to guide and hold lift tabs of the first and second suspension arms in place when parked;
        a separator configured to be suspended between the first suspension arm and the second suspension arm in a position away from the ramp and beyond leading edges of the first and second sliders, such that leading edges of the first and second sliders are positioned between the separator and the ramp when the lift tabs are in contact with the ramp; and
        a connector configured to connect the separator to the ramp,
            wherein a thickness of the separator is greater than a thickness of the connector.

14. The magnetic hard disk drive of claim 13, wherein the connector includes a fin that connects the separator to the ramp, wherein the separator is further configured to have a minimum thickness to prevent the first slider and the second slider from contacting the fin in response to flexion of the first and second suspension arms when the lift tabs are in contact with the ramp.

15. The magnetic hard disk drive of claim 14, wherein the fin comprises a window arranged such that no structure is present between the first slider and the second slider when the lift tabs are in contact with the ramp.

16. The magnetic hard disk drive of claim 14, wherein the fin comprises a cutout arranged to provide additional clearance between the fin and the first slider and between the fin and the second slider when the lift tabs are in contact with the ramp.

17. The magnetic hard disk drive of claim 13, wherein the connector includes a support arm that connects the separator to the ramp and arranged such that no structure is present between the first slider and the second slider when the lift tabs are in contact with the ramp.

18. A magnetic hard disk drive apparatus having a first suspension arm, a first slider having a magnetic head for recording to a disk, the first slider supported by the first suspension arm, a second suspension arm, and a second slider having a magnetic head, the second slider supported by the second suspension arm, the apparatus comprising:
    a ramp configured to guide and hold lift tabs of the first and second suspension arms in place when parked;
    a separator configured to be suspended beyond leading edges of the first and second sliders, such that the first and second sliders are positioned between the separator and the ramp when the lift tabs are in contact with the ramp; and
    a fin that connects the separator to the ramp, wherein the separator is further configured to have a minimum thickness to prevent the first slider and the second slider from contacting the fin in response to flexion of the first and second suspension arms when the lift tabs are in contact with the ramp;
    wherein the fin comprises a window arranged such that no structure is present between the first slider and the second slider when the lift tabs are in contact with the ramp.

19. A magnetic hard disk drive apparatus having a first suspension arm, a first slider having a magnetic head for recording to a disk, the first slider supported by the first suspension arm, a second suspension arm, and a second slider having a magnetic head, the second slider supported by the second suspension arm, the apparatus comprising:
    a ramp configured to guide and hold lift tabs of the first and second suspension arms in place when parked;
    a separator configured to be suspended beyond leading edges of the first and second sliders, such that the first and second sliders are positioned between the separator and the ramp when the lift tabs are in contact with the ramp; and
    a support arm that connects the separator to the ramp and arranged such that no structure is present between the first slider and the second slider when the lift tabs are in contact with the ramp.

20. A ramp assembly for a hard disk drive comprising a first slider that comprises a magnetic head, the first slider supported by a first suspension arm, a second slider comprising a magnetic head, the second slider supported by a second suspension arm, the ramp assembly comprising:
    a ramp configured to guide and hold lift tabs of the first and second suspension arms in place when parked;
    a separator configured to be suspended between the first suspension arm and the second suspension arm in a position away from the ramp and beyond leading edges of the first and second sliders, such that leading edges of the first and second sliders are positioned between the separator and the ramp when the lift tabs are in contact with the ramp; and
    a connector configured to connect the separator to the ramp,
        wherein a thickness of the separator is greater than a thickness of the connector.

* * * * *